United States Patent
Kurasawa

Patent Number: 5,800,772
Date of Patent: Sep. 1, 1998

[54] METHOD FOR PRODUCING EMBOSSED CARRIER TAPE SYSTEM

[75] Inventor: Yasuyuki Kurasawa, Tochigi-ken, Japan

[73] Assignee: Yayoi Corporation, Tokyo, Japan

[21] Appl. No.: 701,448

[22] Filed: Aug. 22, 1996

Related U.S. Application Data

[62] Division of Ser. No. 409,083, Mar. 22, 1995, abandoned.

[51] Int. Cl.$^6$ ............. B29C 51/10; B29C 51/20
[52] U.S. Cl. .......... 264/554; 264/555; 264/292; 264/297.6; 425/388
[58] Field of Search ................. 264/554, 555, 264/284, 292, 297.3, 297.6; 425/388

[56] References Cited

U.S. PATENT DOCUMENTS

| | | | |
|---|---|---|---|
| 2,660,757 | 12/1953 | Smith et al. | 18/19 |
| 2,920,977 | 1/1960 | Adams | 264/255 |
| 3,026,231 | 3/1962 | Chavannes | 156/205 |
| 3,027,596 | 4/1962 | Knowles | 18/19 |
| 3,181,202 | 5/1965 | Martelli et al. | 264/553 |
| 3,352,954 | 11/1967 | Smith | 264/90 |
| 3,535,413 | 10/1970 | Glenn | 264/160 |
| 3,660,189 | 5/1972 | Troy | 156/145 |
| 3,667,889 | 6/1972 | Martelli | 264/553 |
| 3,931,383 | 1/1976 | Erlewine et al. | 264/92 |
| 3,932,248 | 1/1976 | Keaton | 156/210 |
| 3,966,383 | 6/1976 | Bussey et al. | 425/388 |
| 5,123,984 | 6/1992 | Allport et al. | 264/154 |

Primary Examiner—Jan H. Silbaugh
Assistant Examiner—Edmund H. Lee

[57] ABSTRACT

A tape as unwound from a roll is passed through a preheater where it is preheated, and then heated to the softening temperature of the tape material by a main heater. The tape having ceased to retain its flat configuration due to being softened will drape over and come into close contact with generally the entire side surfaces of convex molds except for those portions of the tape located between adjacent convex molds. The tape thus generally brought into close contact with the convex molds continues to be moved with a rotating drum and is exposed to vacuum drawn through the slits formed at the roots of the opposed side walls of the convex molds while it is urged against a drum by the hold-down roller whereby those portions of the tape remote from the convex molds and located between adjacent convex molds are drawn into close contact with the front and back surfaces of the convex molds. With further rotation, the tape arrives at the position of a cooling device where it is sprayed with air containing a coolant such as water. At the point at which the tape is cooled down back to substantially the normal temperature, it is removed from the rotating drum while the slits are disconnected from the vacuum source, and then taken up around a take-up.

6 Claims, 3 Drawing Sheets

METHOD FOR PRODUCING EMBOSSED CARRIER TAPE SYSTEM

This application is a continuation of application Ser. No. 08/409,083 filed on Mar. 22, 1995, now abandoned.

BACKGROUND OF THE INVENTION

1. Field of the Invention

The present invention relates to at method for producing an embossed carrier tape having a plurality of pockets spaced longitudinally of the tape for accommodating surface mountable electronic parts using a rotating drum having a plurality of molds disposed around the outer periphery at equal intervals circumferentially of the drum for forming the pockets.

2. Background of the Invention

In the art of forming the pockets of an embossed carrier tape using a rotating drum, it is a common practice to employ a rotating drum having a plurality of female molds disposed around the outer periphery at equal intervals circumferentially of the drum. The dimensions of the cavities of the molds are such that they are oversized relative to the outside dimensions of the pockets being formed, taking into account the thickness and thermal contraction of the tape after molding. In the production of an embossed carrier tape by the use of such molding, the tape is incrementally heated by a heater to the softening temperature thereof, and is then guided to pass around the periphery of the drum while vacuum-drawing the tape into the successive female molds as it covers the molds whereby pockets having the outside dimensions conforming with the inside dimensions of the molds are continuously formed. Such a molding method has the advantage that there is no accumulative dimensional errors in the molding as the same molding is repeated each time the drum is rotated through one revolution.

After the molding, the carrier tape is formed along its side margin with sprocket engaging perforations for feeding the embossed carrier tape at constant intervals during the operation of mounting electronic parts in the pockets, and further the tape is formed through the bottom wall of the pockets with holes for inspecting electronic parts mounted in the pockets. Such inspection holes are typically formed by punching the tape relative to to a reference position.

When designing the mold, it is necessary to determine the inside dimensions of the mold cavity taking into account the thickness of the tape and the depth of the pocket to be formed as well as the thermal contraction of the tape after molding. As more severe dimensional tolerances are required, more precise data involved with designing the mold and a higher level of skills may be required.

In addition, in the female molding, the central portion of the bottom wall of the pocket excluding the portion being suctioned tends to be raised inwardly, so that adjustments are also required to insure the flatness of the bottom wall during the molding operation.

Moreover, even though the cavity of the female mold is provided with no radius at its corners, the pocket will be provided at its bottom corners with a radius corresponding to the thickness of the plastic tape, so that it is generally difficult to make the clearance between the bottom wall of the pocket and a surface mountable electronic component smaller than the film thickness of the tape.

In addition, the recent trend is directed toward increasing the mounted density of surface mountable electronic components in order to meet the need for the enhanced level of integration of such electronic parts. It is accordingly needed to reduce the aforesaid clearance as well as decreasing the size of the pocket of the embossed carrier tape to conform with the reduced size of electronic parts. However, the aforesaid problems associated with such needs render it difficult to keep the pockets within the required dimensions.

If the clearance were too great and/or if the pocket corners were radiused, electronic parts could be caught in the pockets, be shaky or unstable, ride on the radiused pocket corners, or sometimes even turn laterally or turn over. These events could occur not only during the taping operation but also during the operation of automatically mounting electronic parts on a printed circuit board using a surface-mounting machine. Since it would be virtually impossible to correct the attitude of an electronic part accommodated in a pocket, a part improperly positioned in a pocket not only can fail to be suctioned out of the pocket or can be improperly attracted as it is being removed from the pocket, but also can fail to be mounted on a printed circuit board.

Furthermore, since in the prior art the pocket molding and punching operations are separately performed, sprocket engaging perforations and/or inspection holes need be punched relative to some or other reference, requiring that adjustments relative to the reference be made at all times.

SUMMARY OF THE INVENTION

Accordingly, the first and second objects of the present invention are to provide a method for producing an embossed carrier tape in which the first and second problems with the prior art as mentioned above may be solved or mitigated.

The first object of this invention is accomplished by providing a method for producing an embossed carrier tape having a plurality of pockets spaced longitudinally of the tape for accommodating surface mountable electronic parts, comprising: providing a rotatable drum having a series of molds disposed around the outer periphery at equal intervals circumferentially of the drum for forming the pockets, and while rotating the drum, disposing a heated and softened plastic tape against said series of molds and vacuum drawing the tape toward the molds to thereby form a plurality of pockets spaced longitudinally of the tape which conform in shape with the molds, characterized in that each of said molds is of a convex shape and has outside dimensions corresponding with the inside dimensions of the pocket to be formed.

The second object of the present invention is accomplished by providing each of said convey molds with bosses for forming projections on said tape from which holes may be formed.

The mold used according to the teaching of this invention has a convex shape to prevent thermal contraction of the tape after molding, whereby in designing the mold, little regard needs to be given to the thermal contraction of the material of which the tape is made, as is the case with the conventionally used concave (female) mold.

Further, with the convex mold, when the tape is heated and softened directly above the mold, it will naturally drape over and come into close contact with the mold to thereby be shaped to some extent prior to being vacuum formed, so that there occurs no uneven thickening in the side walls of the pocket or no deformation in the bottom wall during the subsequent vacuum forming.

In addition, since the radii at the corners of the pocket are formed in precise conformation with those of the mold, reduction in radii of the mold makes it possible to correspondingly decrease the radii at the corners of the pocket.

It is thus to be appreciated that the present invention may satisfy the dimensional requirements for pockets of an embossed carrier tape to accommodate a yearly reduction in size of surface mountable electronic parts with an enhanced level of integration.

Another advantage of this invention is that there is no need for punching the tape relative to some or other reference as is the case with the prior art, since it is only required to cut off the projections (as will be described later) at their roots after the forming pockets are formed in order to form sprocket engaging perforations and/or inspection holes.

BRIEF DESCRIPTION OF THE DRAWINGS

The foregoing summary, as well as the following detailed description, will be better understood when read in conjunction with the accompanying drawings, in which.

DESCRIPTION OF THE PREFERRED EMBODIMENTS

Figure 1:
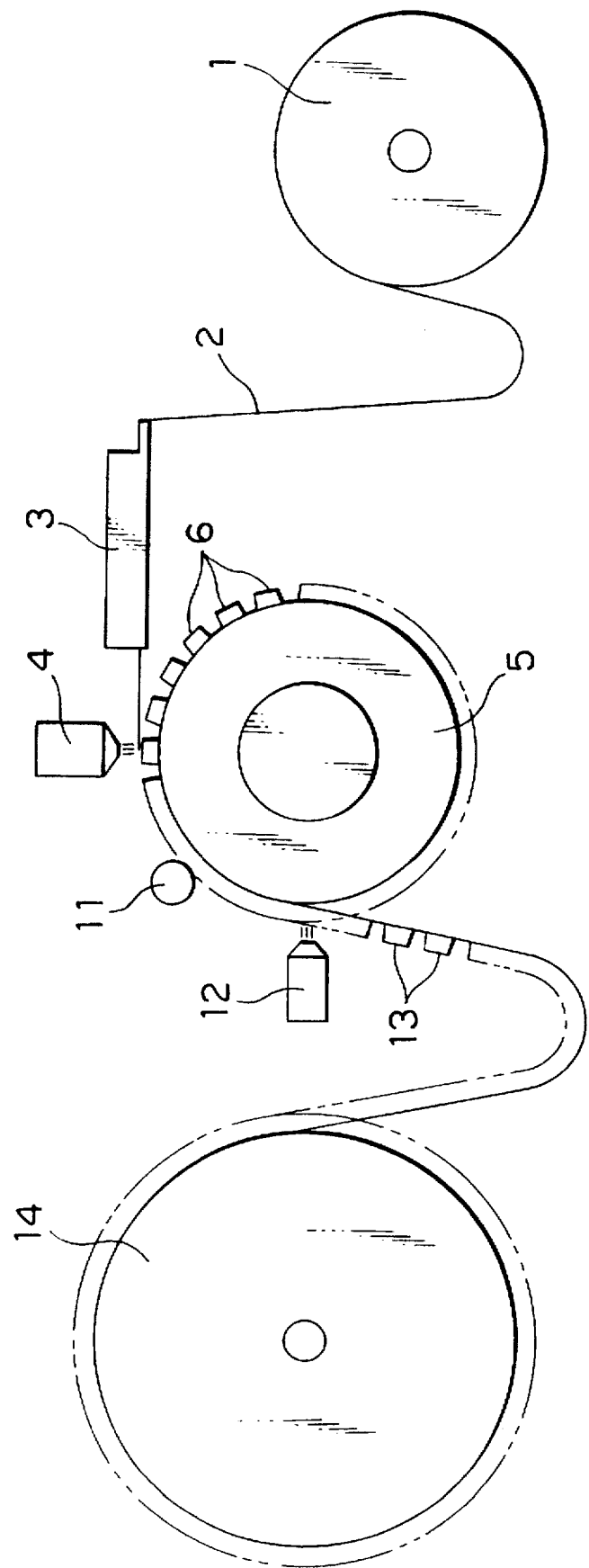
FIG. 1 is a general schematic view illustrating an apparatus used in the practice of this invention.

Referring to the drawings, FIG. 1 schematically shows an apparatus used in the practice of this invention. The reference numeral 1 is a roll of tape to be embossed which has been slit into a predetermined width out of a broad film of thermoplastic material. Tape 2 as unwound from the roll 1 is passed through a preheater 3 where it is preheated to a certain temperature, and then heated to its softening temperature by a main heater 4, followed by being Guided onto the top of a rotating drum 5.

According to this invention, molds 6 disposed at equal intervals around the outer periphery of the rotating drum 5 for forming pockets for accommodating surface mountable electronic parts are of male or convex shape complementary to the shape of a pocket to be formed as illustrated, as opposed to female or concave molds conventionally employed heretofore.

Figure 2:
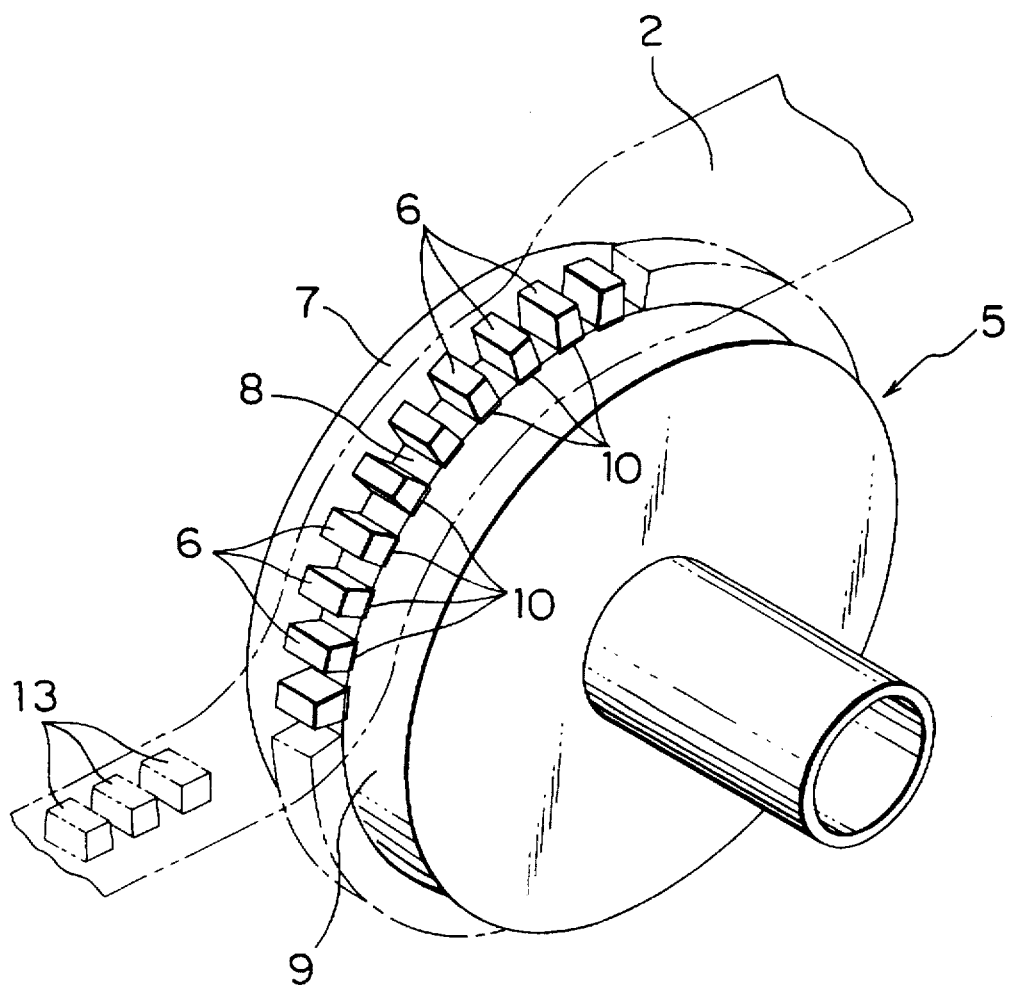
FIG. 2 is an enlarged perspective view of a rotating drum having molds disposed around the outer periphery at equal intervals circumferentially of the drum.

As seen in FIG. 2, the rotating drum 5 is built up of three drum sections 7, 8 and 9 to facilitate the formation of vacuum suction slits 10. The generally rectangular pocket forming convex molds 6 are disposed at equal intervals around the outer periphery of the central drum section 8, and the outer lateral drum sections 7 and 9 positioned at opposite sides of the central drum section 8 are formed with the vacuum suction slits 10 at the positions corresponding to the roots of the opposed side walls of the respective pocket forming convex molds 6. These slits 10 perform the same function as that of the vacuum suction slits formed through the bottom of the conventional concave mold and are substantially similar in construction as well. While the suction slits 10 are illustrated as being formed through the lateral drum sections 7 and 9, such slits may be formed through the central drum section 8. In that case, although it would be somehow troublesome to make the slits, one advantage among others is that there is no need for aligning the suction slits of the lateral drum sections 7 and 9 with convex molds 6 of the central drum section 8.

Returning to FIG. 1, the reference numeral 11 designates a hold-down roller for pressing the heat softened tape 2 against the convex molds 6; 12 is a cooling device for spraying coolant against the tape to prevent it from deforming as it is removed from the successive molds; and 14 is a take-up reel for taking up the tape having a series of pockets 13 formed thereon by the convex molds 6.

An example of forming an embossed carrier tape will now be described in which a tape 2 of PET (polyethylene terephthalate) having a thickness of 200 µm and a width of 8 mm is molded to have pockets each having a size of 1.6 mm×8 mm. The tape 2 as paid out from the roll 1 is gradually heated to 70° to 80° C. by the preheater 3 and further heated to the softening temperature of the material, that is, 130 ° C. by using the main heater 4 positioned directly above the rotating drum 5. The tape 2 having ceased to retain its flat configuration at this temperature begins to drape over and come into close contact with the convex molds 6 except for those portions of the tape located between adjacent convex molds 6. The tape 2 thus generally or partially brought into close contact with the convex molds 6 continues to be moved with the rotating drum 5 and is exposed to vacuum drawn through the slits 10 formed at the roots of the opposed side walls of the convex molds 6 while it is urged against the drum by the hold-down roller 11 whereby those portions of the tape remote from the convex molds 6 and located between adjacent convex molds 6 are drawn into close contact with the entire molding surface area of the convex molds 6.

With further rotation, the tape arrives at the position of the cooling device 12 where it is sprayed with air containing a coolant such as water. It should be here noted that with the use of the conventional concave mold, the pockets could possibly deform due to the tendency to freely contract within the concave recess formed in opposition to the vacuum suctioning force while the tape is cooled back to the normal temperature with the aid of the spraying. In this regard, according to this invention, free contraction of the tape 2 during the cooling is interfered with by the convex mold whereby any further contraction is allowed and hence deformation due to contraction is prevented.

As the tape as cooled down back to substantially the normal temperature continues to rotate, it is removed from the molds while the slits 10 are successively disconnected from the vacuum source, and then the formed tape is taken up around the take-up reel 14.

Generally, the molding shrinkage depends on the type of material utilized. Accordingly, the more strict allowable tolerances were required, the more careful attention was heretofore needed to be paid to the degree of molding shrink of the material in designing the mold and a vast amount of data concerning the mold design was necessary. In contrast, according to this invention in which no substantial influence of molding contraction is involved as indicated above, it has been found possible to keep the pockets formed within the allowable tolerances of 50 µm with respect to the aforesaid clearance without taking the molding shrink into account. In addition, the finished pockets have been found to have no significant unevenness in the wall thickness as well as having a substantially flat bottom surface.

Figure 3:
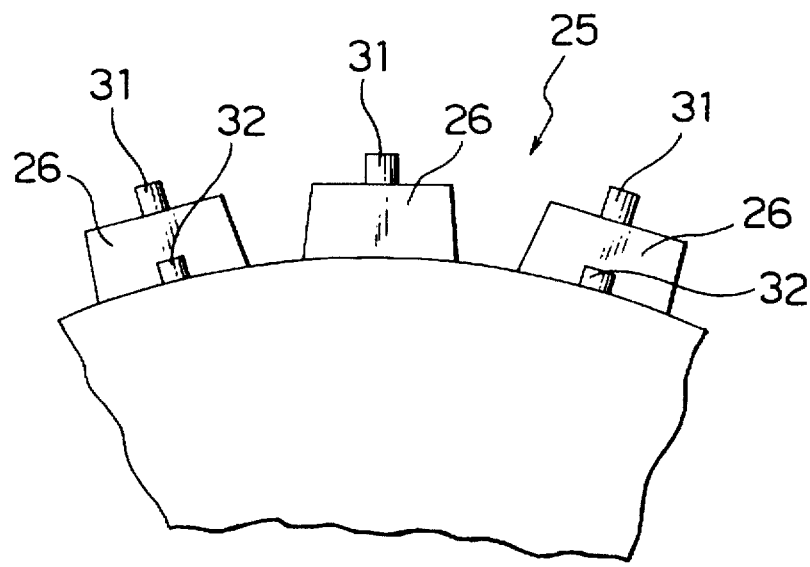
FIG. 3 is a fragmentary view showing a part of the rotating drum having hole forming bosses extending therefrom.

According to another aspect of this invention, projections from which holes may be formed are molded on a tape simultaneously with forming of pockets. FIG. 3 shows a part of the rotating drum 25 for use for that purpose. Specifically, the pocket forming convex molds 26 are disposed at equal intervals around the outer periphery of the central drum section of the rotating drum 25, and each of the generally rectangular convex molds 26 has a boss 31 extending from the top surface thereof. The boss 31 is designed to form a projection on the tape from which an inspection hole may be formed. One of the outer lateral drum sections of the rotating drum has a series of bosses 32 for molding projections on the tape from which sprocket engaging perforations may be formed. Such sprocket perforation forming bosses 32 are positioned at the side of every other convex mold 26.

If the vacuum suction slits 10 formed through the two outer lateral drum sections alone as illustrated in FIG. 2 are not sufficient to vacuum mold an embossed carrier tape, the rotating drum 25 may be split into more drum sections in which additional vacuum suction slits 10 may be formed.

Figure 4:
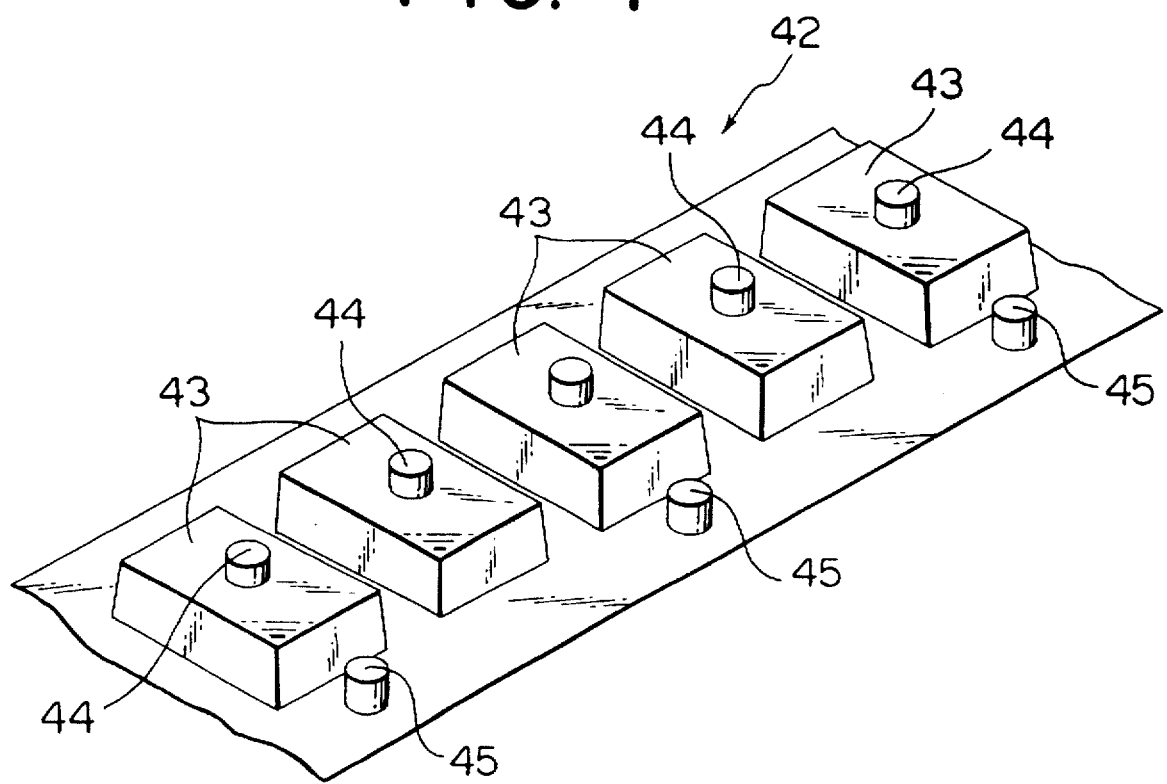
FIG. 4 is an enlarged perspective view illustrating a part of the embossed carrier tape formed by the use of the rotating drum shown in FIG. 3.

FIG. 4 shows a part of the embossed carrier tape 42 produced by using the rotating drum 25 of FIG. 3. The projections 44 formed on the pockets 43 and the projections 45 formed on the tape at the side of every other pocket 43 are cut off at their roots to form inspection holes and sprocket engaging perforations, respectively.

As explained hereinabove, it is to be understood that according to this invention it is easier to design the mold as compared with the conventional concave mold. In addition, since the tape heat softened naturally drapes over and comes into close contact with the mold to thereby be shaped to some extent prior to being vacuum formed, there is unlikely to occur any uneven thickening in the side walls of the pocket or deformation in the bottom wall during the subsequent vacuum forming.

In addition, since radii at the corners of the pocket may be eliminated if no radii is provided at the corners of the mold, it is possible to adequately satisfy even the requirements that the clearance between the bottom wall of the pocket and a surface mountable electronic component be kept less than 50 µm to accommodate a yearly reduction in size of surface mountable electronic parts.

Moreover, when it is desired to form sprocket engaging holes and inspection holes through the tape, it is only required to cut off the projections at their roots after the forming pockets are formed, so that no reference need be provided for punching such holes as is the case with the prior art.

I claim:

1. A method for producing an embossed carrier tape having a plurality of longitudinally spaced pockets therein for accommodating surface mountable electronic parts, comprising the steps of:

providing a rotatable drum having an outer circumferential peripheral surface which is divided into three adjacent sections including a central drum section, and first and second outer drum sections which are disposed on each of opposite sides of the central drum section, and a series of molds formed around the peripheral surface of the central drum section at equal intervals circumferentially of the rotatable drum for forming the plurality of longitudinally spaced pockets, each mold of the series of molds having opposing lateral sides, each said lateral side having a root at one of said first and second outer drum sections, and a slit formed at each root;

preheating a plastic tape prior to applying the plastic tape to the rotatable drum;

applying the preheated plastic tape against the series of molds while rotating the drum;

further heating the plastic tape against the series of molds to form a further heated tape; and vacuum drawing the further heated tape against the series of molds through the slits to thereby produce a formed plastic tape with the plurality of longitudinally spaced pockets formed therein which conform in shape with the series of molds, wherein each of said series of molds is of a convex shape with respect to the peripheral surface of the drum, and which has outside dimensions corresponding with inside dimensions of one of the plurality of longitudinally spaced pockets formed.

2. The method according to claim 1, further comprising the step of:

providing a plurality of first bosses formed on the peripheral surface of the rotatable drum at one of the first and second outer drum sections, such that the step of vacuum drawing the further heated plastic tape draws the further heated plastic tape over the plurality of first bosses to form a plurality of first projections within the formed plastic tape.

3. The method according to claim 2, further comprising the step of:

forming a projecting boss on an upper surface of each mold of the series of molds, such that the step of vacuum drawing the further heated plastic tape draws the further heated plastic tape over each projecting boss to form a plurality of second projections within the formed plastic tape.

4. The method according to claim 2, wherein the plurality of first bosses are provided on the first and second outer drum sections of said rotatable drum.

5. The method according to claim 1, further comprising the step of:

pressing the further heated tape against the series of molds.

6. The method according to claim 1, wherein the step of preheating includes heating the plastic tape to a first temperature, and the step of further heating the plastic tape includes heating to the softening temperature thereof, the softening temperature being greater than the first temperature.

* * * * *